United States Patent [19]

Baum

[11] Patent Number: 5,303,358
[45] Date of Patent: Apr. 12, 1994

[54] PREFIX INSTRUCTION FOR MODIFICATION OF A SUBSEQUENT INSTRUCTION

[75] Inventor: Allen J. Baum, Palo Alto, Calif.

[73] Assignee: Apple Computer, Inc., Cupertino, Calif.

[21] Appl. No.: 4,627

[22] Filed: Jan. 14, 1993

Related U.S. Application Data

[63] Continuation of Ser. No. 471,092, Jan. 26, 1990, abandoned.

[51] Int. Cl.⁵ .......................... G06F 9/30; G06F 9/34
[52] U.S. Cl. ................. 395/375; 364/261.2; 364/247.4; 364/232.23; 364/946.7; 364/263; 364/948.3; 364/DIG. 1; 395/400; 395/800
[58] Field of Search ................... 395/375, 400, 800

[56] References Cited

U.S. PATENT DOCUMENTS

| | | | |
|---|---|---|---|
| 3,657,705 | 4/1972 | Mekoka, Jr. et al. | 364/200 |
| 3,868,649 | 2/1975 | Sato et al. | 364/200 |
| 4,466,057 | 8/1984 | Houseman et al. | 395/375 |
| 4,531,200 | 7/1985 | Whitley | 364/900 |
| 4,724,517 | 2/1988 | May | 364/200 |
| 5,005,118 | 4/1991 | Lenoski | 364/200 |
| 5,041,968 | 8/1991 | Yamaguchi | 364/200 |
| 5,148,530 | 9/1992 | Joyce et al. | 395/375 |

OTHER PUBLICATIONS

"The IBM Personal Computer from the Inside Out", pp. 96-101, Murray Sargent III, Addison-Wesley Publishing Company, 1984.
"iAPX 86/88, 186/188 User's Manual, Hardware Reference", Intel, 1985, pp. 1-6 to 1-10, 1-19, 1-20, 1-53.

Primary Examiner—Robert B. Harrell
Assistant Examiner—Ken S. Kim
Attorney, Agent, or Firm—Blakely, Sokoloff, Taylor & Zafman

[57] ABSTRACT

A method and apparatus for instruction prefixing selectively reconfigures certain of the instructions in the microprocessor's instruction set so as to alter the nature of the operation performed by the instruction and/or the designation of operand or result locations accessed by the operation. A prefix instruction is inserted ahead of a "using" instruction and an operational parameter of the using instruction is modified in accordance with the contents of the prefix instruction. In one application, the prefix instruction may be used to specify a register location for storage of a result of the using instruction's operation or retrieval of an operand. In other applications, the prefix instruction may be used to modify other aspects of instruction execution.

4 Claims, 2 Drawing Sheets

PREFIX INSTRUCTION FOR MODIFICATION OF A SUBSEQUENT INSTRUCTION

This is a continuation of application Ser. No. 07/471,092, filed Jan. 26, 1990, now abandoned.

FIELD OF THE INVENTION

The present invention relates to the field of data processing and, more particularly, to methods of controlling the operation of a processing unit.

BACKGROUND OF THE INVENTION

Microprocessors are widely used to perform all manner of data processing functions. More sophisticated data processing applications involving large quantities of data, for example 3-D graphics processing, place ever increasing demands on the operational speeds of microprocessors. One approach to achieving higher speeds is to minimize the physical path lengths that signals must travel within the processor. Not only is it desirable to construct the entire processor on a single integrated circuit chip, but the critical path lengths on the chip should be minimized as well. Since chip processing techniques place practical limits on circuit dimensions, there is an inherent conflict between providing greater processor versatility (requiring more logic circuitry and hence more on-chip real estate) and providing higher speeds.

Since many data processing tasks involve a relatively few number of operations, but require that they be performed on large arrays of data, the conflict between speed and versatility in such applications is resolved in favor of speed by limiting the number of defined operations the processor can perform and limiting the size (in bits) of operands within the processor. A processor so optimized is commonly referred to as a reduced instruction set computer (RISC).

Although a RISC processor may be optimized to perform certain repetitive data processing tasks, it is desirable that the processor be able to perform an extended range of functions without undue degradation in performance. One approach to overcoming the limitations of a fixed instruction length is to prefix an instruction with another instruction such that operands can be constructed having a greater number of bits than can be specified by a single instruction. U.S. Pat. No. 4,724,517 issued to May describes a RISC processor in which an operand register concatenates values provided by a prefix instruction and a using instruction to accumulate a value of variable bit length. Separate prefix instructions are provided for positive and negative values. The operand is constructed in the operand register, and thus each occurrence of a using instruction must be immediately preceded by the appropriate prefix instruction(s).

SUMMARY OF THE INVENTION

The present invention represents a departure from such prior art systems by providing a method and apparatus for instruction prefixing wherein certain of the instructions in the microprocessor's instruction set are selectively reconfigured so as to alter the nature of the operation performed by the instruction and/or the designation of operand or result locations accessed by the operation.

A prefix instruction is inserted ahead of a "using" instruction and an operational parameter of the using instruction is modified in accordance with the contents of the prefix instruction. In one application, the prefix instruction may be used to specify a register location for storage of a result of the using instruction's operation or retrieval of an operand. In other applications, the prefix instruction may be used to modify other aspects of instruction execution.

NOTATION AND NOMENCLATURE

Figure 1:
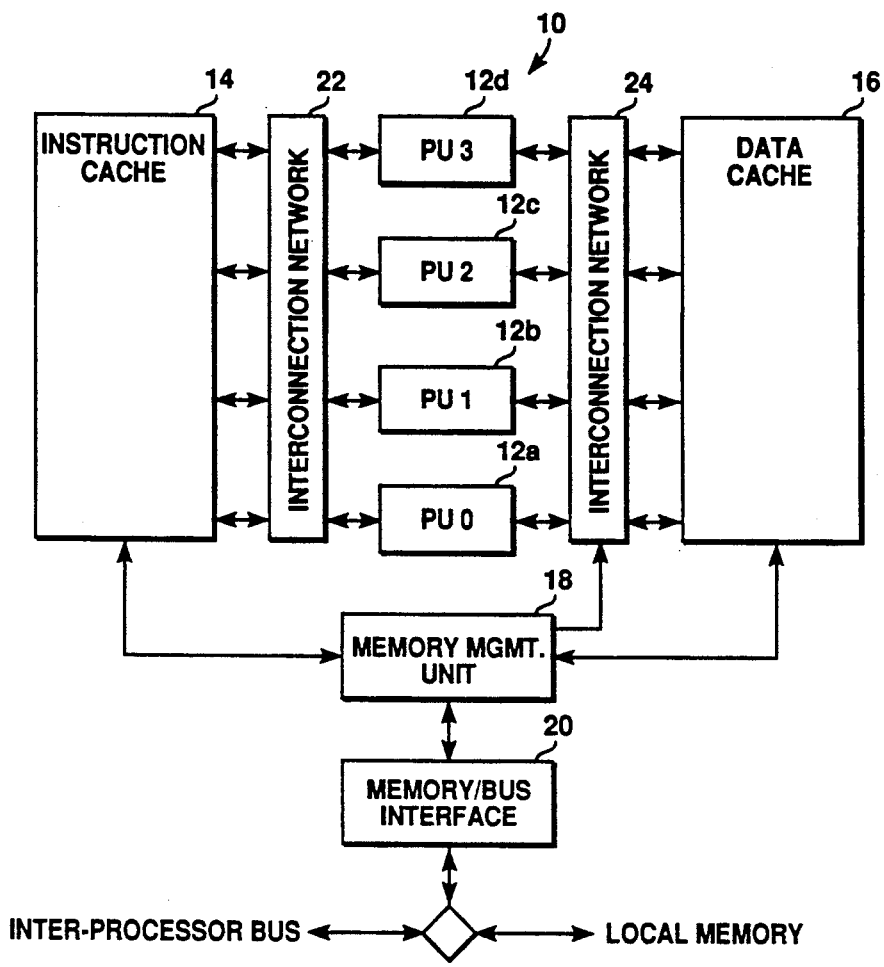
FIG. 1 is a functional block diagram of a central processing unit (CPU) suitable for implementing the present invention.

The detailed description which follows is presented largely in terms of algorithms and symbolic representations of operations on data bits within a computational device. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities. Further, the manipulations performed are also referred to in terms, such as adding or comparing, which are commonly associated with mental operations performed by a human operator. No such capability of a human operator is necessary, or desirable in most cases, in any of the operations described herein which form part of the present invention; the operations are machine operations. While the present invention is most advantageously applied in a microprocessor, other useful machines for performing the operations of the present invention may include general purpose digital computers and similar devices. In all cases, the distinction between the method operations and operating a computer and the method of computation itself should be noted. The present invention relates, in part, to method steps for operating the processor and thereby process electrical signals to generate other desired electrical signals.

DETAILED DESCRIPTION OF THE INVENTION

In the following description, for purposes of explanation and not limitation, specific data representations, bit assignments, sequences of operation, etc. are set forth in order to provide a thorough understanding of the present invention. However, it will be apparent to one skilled in the art that the present invention may be practiced in other embodiments that depart from these specific details. In other instances, detailed descriptions of well known data processing devices, techniques and algorithms are omitted so as not to obscure the description of the present invention with unnecessary detail.

The present invention is applicable to any programmable data processing device having instructions of a fixed and/or relatively few number of bits. A category of devices to which the present invention is particularly applicable are those that are commonly classified as reduced instruction set computers (RISCs). An exemplary RISC processor employing the present invention will be described for purposes of illustrating the features and advantages thereof. However, it is to be understood that the present invention is not limited to such applications.

CPU Overview

Referring to FIG. 1, a CPU indicated generally as 10 comprises four independent processing units (pus) 12a-d which share access to an instruction cache 14, a data cache 16, a Memory Management Unit (MMU) 18, and a Memory/Bus Interface 20. Each of the four identical and independent PUs 12a-d of CPU 10 is a 32-bit RISC processor. The four PUs access the instruction and data caches via interconnection networks 22 and 24. In addition to providing PU cache data transfer paths, these networks provide a direct inter-PU communication path for broadcast operations and global register access, as well as a path for interrupt routing. Instruction and data caches are divided into four banks, and each interconnection network includes a 5×4 crossbar switch, permitting simultaneous instruction and data accesses by all four PUs.

The PUs have a small register-oriented instruction set in which all data access to memory is done by register load and store instructions. Register and word size is 32 bits. Each PU 12a-d has 16 general-purpose registers, a total of 64 for CPU 10, and 7 local registers. Local registers include product, remainder, prefix, and various state saving registers. In addition, the four PUs share 8 global registers, including interrupt, event counter, and global status registers.

All instructions are 16 bits in length. There are two address modes: register, and base plus displacement. Base plus displacement addressing provides a displacement of up to 64 words from the base register address. However, prefixing can be used to increase the displacement range, transform register addressing into base plus displacement addressing (with any register as base), and provide signed displacements.

The 16-bit instruction length limits the size of immediate and displacement fields in the instructions. However, a large proportion of immediate and displacement values encountered in programs are small enough to be contained in these fields. When necessary, larger values can be created by prefixing the immediate or displacement field value.

The elements and organization of CPU 10 can be better understood in terms of a programming model comprising the elements of the CPU which are visible to a programmer (i.e., can be operated on by instructions). These elements include general registers, status register and program counter, special registers, and the instruction and data caches.

Figure 2A:
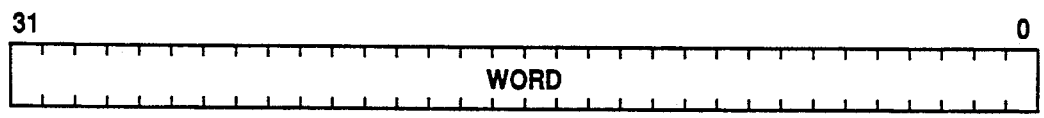
FIG. 2a, 2b, and 2c each illustrates the bit and byte structure of data words, halfwords, and bytes respectively in the CPU of FIG. 1.
Figure 2B:
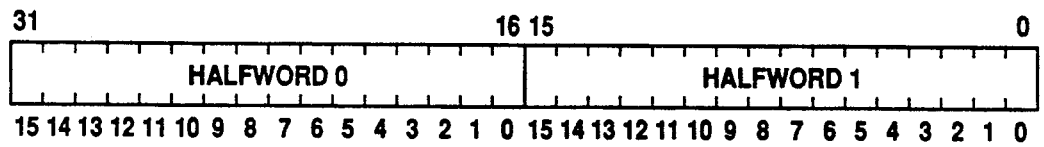
Figure 2C:
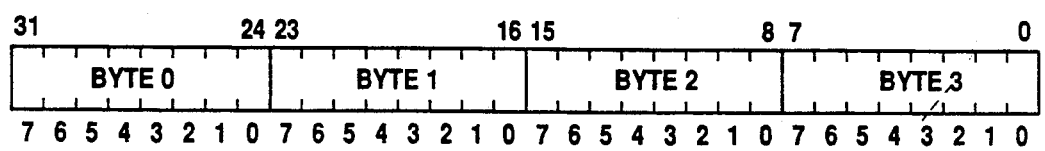

Various instructions operate on 32-bit full words, 16-bit half words, 8-bit bytes, and individual bits. Instructions themselves always are a half word in length. Only words and bytes can be directly loaded into a register from memory or stored to memory from a register. Arithmetic operations can be performed on words, half words, and bytes. As illustrated in FIG. 2, the 32 bits of a word are numbered right to left, from 0 to 31. Bit 0, the rightmost bit, is the least significant bit. Higher-numbered bits often are referred to as the high-order bits, and lower-numbered bits often are referred to as the low-order bits.

Half words and bytes within a word are positioned as shown in FIG. 2, which also shows bit ordering within half words and bytes. Byte 0 is the most significant (leftmost) byte, while byte 3 is the least significant (rightmost) byte.

The programming model comprises a general register set, status register and program counters, a special register set, and the instruction and data caches. Each PU has its own general register set, status register, and program counters; these registers are said to be local to the PU. Each PU also has its own copy of certain special registers, while other special registers are common to all PUs; these are called global registers.

Each PU has 16 32-bit general registers, numbered 0–15, so that there are 64 general registers for the CPU as a whole. General registers are generally interchangeable; any register can be used for any purpose. Any individual general register can be loaded from memory or have its contents stored to memory.

Register "Renaming"

The features and advantages of the present invention will first be illustrated as a means for "renaming" an operand or result register of an instruction.

In the exemplary processor, an Add instruction has the form:

Add Reg B, Reg A which yields the operation:

(Reg A)+(Reg B)→(Reg B)

where Reg A and Reg B are any two of the processor's sixteen general purpose registers. The instruction word comprises an eight-bit operation code and two four-bit fields for designating Reg A and Reg B. As a result of executing an Add instruction, the contents of Reg A are added to the contents of Reg B and the result is stored in Reg B, replacing the original contents thereof.

The foregoing implementation of the Add instruction has the disadvantage that the original operands are not preserved in their respective general purpose registers. It is frequently desired to add the contents of two registers and place the results in a third register, thereby retaining the original operands for further operations. Such an instruction would have the form:

(Reg A)+(Reg B)→(Reg C)

However, in the exemplary processor, this would require three four-bit fields to specify registers A, B, and C. Recalling that all instructions are 16-bits in length, this would leave only four bits for the operation code.

While it is possible to define such an instruction, and in fact the instruction set of the exemplary processor includes instructions having operation codes of as few as three bits, the total number of definable instructions would necessarily be reduced. It will be recognized that this is one of the trade-offs inherent in defining the architecture of a RISC processor.

Figure 3:
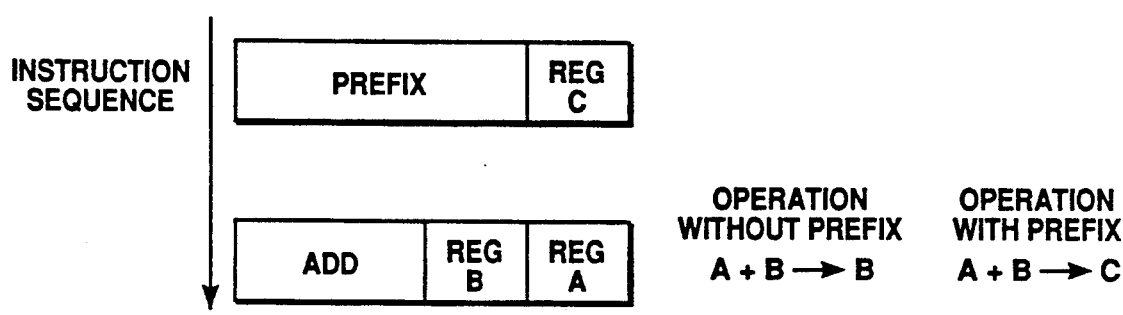
FIG. 3 illustrates an instruction sequence in which a prefix instruction renames a register of a subsequent instruction.

Rather than define a three-operand Add instruction, the present invention utilizes a special purpose prefix instruction by which the destination register of the two-operand ADD instruction may be "renamed" as illustrated in FIG. 3. This prefix instruction, inserted ahead of the Add instruction, contains a four-bit field for designating one of the general purpose registers. The instruction sequence is thus:

```
Prefix   Reg C
Add      Reg B, Reg A
``` yielding the operation:

Reg A+Reg B→Reg C

Although an additional instruction is inserted in the instruction sequence, there is little or no impact on the speed of execution because the Prefix instruction may be executed in parallel with the instruction immediately preceding it. In the exemplary processor, the instruction decode logic is optimized for parallel execution of an instruction and a following instruction where the following instruction is of a type such as the Prefix instruction that does not itself access any of the operand registers.

Although the present invention has been described in terms of an Add instruction, it is equally applicable to an instruction involving any other arithmetic or logical operation. Furthermore, although the present invention has been described in terms of modifying the destination register for the result of the instruction, it is also possible to modify any of the operands of a using instruction. In the latter case, some penalty in processing speed may be incurred since the operands cannot be automatically fetched from the registers designated in the instruction's operand fields.

Operational Modifications

Figure 4:
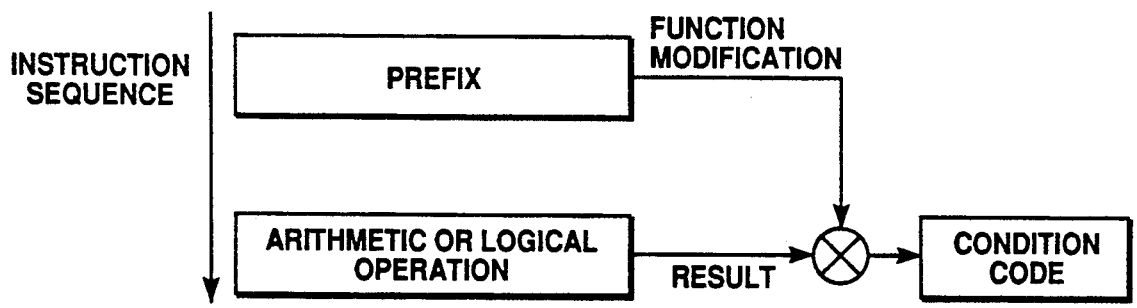
FIG. 4 illustrates an instruction sequence in which a prefix instruction modifies the operation of a subsequent instruction.

Apart from modifying the location of an operand or result of an instruction, the present invention may also be advantageously applied to modify other aspects of instruction execution. For example, the exemplary processor maintains condition codes for negative, zero, overflow and carry which are set or cleared based on the results of arithmetic and certain other operations. By defining an appropriate prefix instruction, the ability of a following instruction to set or clear one or more of the condition codes (as designated in the prefix instruction) may be inhibited or enabled as illustrated in FIG. 4. Likewise, the arithmetic, logical or other conditions under which the condition codes are set or cleared may be modified by a prefix instruction.

For another example of a way in which instruction execution may be modified using the present invention, storage of a result of an operation may be inhibited. In the above described Add instruction, the contents of register B are replaced with the arithmetic sum of the contents of registers A and B. Appropriate modification of the instruction execution using a prefix instruction can inhibit storage of the result in register B, thereby leaving the original contents of the register intact. In this way, an Add instruction may be used to perform a compare operation eliminating the need to define a separate compare instruction.

Still other examples of ways in which a prefix instruction according to the present invention may be used to modify execution of a following instruction are to modify a signed operation to an unsigned operation or vice versa, to selectively enable or disable carry-in and to selectively enable or disable trapping on overflows and other faults.

It should be recognized that the foregoing are merely examples of ways in which the present invention may be employed to reconfigure the instruction set of a microprocessor. In general, it is possible to define a relatively limited set of instructions which perform operations in the manner they are most frequently performed and to employ appropriate prefix instructions to reconfigure the instruction set when it is desired to perform an operation in an alternate manner. This avoids the need to separately define an instruction which implements a seldom used operation without limiting the versatility of the processor.

I claim:

1. A method for operating a data processing device whose operation is controlled by execution of a programmed set of instructions comprising the steps of:
   a) defining a first instruction for performing an operation, said operation having exactly two operands, said first instruction defined to access a first register as a storage location for a first of said two operands and a second register as a storage location for a second of said two operands, said first instruction further defined to store a result of said operation in the first register;
   b) programming said data processing device to execute said first instruction;
   c) executing a second instruction in advance of the first instruction, said second instruction designating a third register different from the first and second registers;
   d) executing the first instruction modified by the second instruction such that the first instruction stores the result of said operation in the third register without modifying the first operand stored in the first register.

2. The method of claim 1 wherein the operation is an arithmetic

3. The method of claim 1 wherein the operation is a logical operation.

4. The method of claim 1 wherein said second instruction is executed substantially concurrently with a third instruction.

* * * * *